(12) United States Patent
Ayukawa

(10) Patent No.: US 9,688,125 B2
(45) Date of Patent: Jun. 27, 2017

(54) VEHICLE BACK DOOR ASSEMBLING METHOD AND VEHICLE BACK DOOR

(71) Applicant: TOYOTA JIDOSHA KABUSHIKI KAISHA, Toyota-shi, Aichi-ken (JP)

(72) Inventor: Tatsuya Ayukawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/958,435

(22) Filed: Dec. 3, 2015

(65) Prior Publication Data

US 2016/0167494 A1    Jun. 16, 2016

(30) Foreign Application Priority Data

Dec. 15, 2014    (JP) ................ 2014-252919

(51) Int. Cl.
| | |
|---|---|
| *B60J 5/10* | (2006.01) |
| *B60J 1/18* | (2006.01) |
| *B29C 65/48* | (2006.01) |
| *B62D 27/02* | (2006.01) |
| *F16B 11/00* | (2006.01) |
| *B29L 31/30* | (2006.01) |

(52) U.S. Cl.
CPC ............ *B60J 5/107* (2013.01); *B29C 65/48* (2013.01); *B60J 1/18* (2013.01); *B62D 27/026* (2013.01); *F16B 11/006* (2013.01); *B29L 2031/30* (2013.01)

(58) Field of Classification Search
CPC ........ B29C 65/48; B29L 2031/30; B60J 1/18; B60J 5/107; B62D 27/026; F16B 11/006
See application file for complete search history.

(56) References Cited

U.S. PATENT DOCUMENTS

| | | | | |
|---|---|---|---|---|
| 5,746,859 A | * | 5/1998 | Gold | B60J 1/006 156/108 |
| 7,306,279 B2 | * | 12/2007 | Saitoh | B60J 5/107 296/146.8 |
| 8,226,151 B2 | * | 7/2012 | Miyake | B60J 5/101 296/106 |
| 8,567,841 B2 | * | 10/2013 | Ginestet | B60J 5/101 296/146.8 |
| 8,646,829 B2 | * | 2/2014 | Crane | B60J 5/101 296/146.5 |
| 8,690,220 B2 | * | 4/2014 | Tsukiyama | B62D 35/007 296/106 |

(Continued)

FOREIGN PATENT DOCUMENTS

| | | | | |
|---|---|---|---|---|
| CA | 2937373 A1 | * | 8/2015 | ............. B60J 5/101 |
| DE | 3151266 A1 | * | 7/1983 | ............. B62D 21/09 |

(Continued)

*Primary Examiner* — Dennis H Pedder
*Assistant Examiner* — Paul Chenevert
(74) *Attorney, Agent, or Firm* — Oliff PLC

(57) ABSTRACT

A method of assembling a vehicle back door includes forming a chamber by joining, with an adhesive, an inner panel made of resin to an outer panel made of resin; and inserting a first holding jig inside the chamber through a hole formed in the outer panel and allowing the adhesive to harden in a state in which a joint portion between the inner panel and the outer panel is sandwiched between and held by the first holding jig and a second holding jig placed outside the chamber.

16 Claims, 3 Drawing Sheets

(56) References Cited

U.S. PATENT DOCUMENTS

| | | | |
|---|---|---|---|
| 8,727,422 B2 | 5/2014 | Iwabuchi et al. | |
| 9,469,180 B2 * | 10/2016 | Kamimura | B60J 5/107 |
| 2014/0203591 A1 * | 7/2014 | Lathwesen | B60J 5/107 |
| | | | 296/146.8 |
| 2016/0031299 A1 * | 2/2016 | Ikeda | B60J 5/107 |
| | | | 49/502 |
| 2016/0075216 A1 * | 3/2016 | Kamimura | B60J 5/107 |
| | | | 296/146.2 |
| 2016/0082816 A1 * | 3/2016 | Ayukawa | B60J 5/107 |
| | | | 29/464 |
| 2016/0167492 A1 * | 6/2016 | Ikeda | B60J 5/10 |
| | | | 296/146.2 |
| 2016/0167493 A1 * | 6/2016 | Adachi | B60J 5/107 |
| | | | 49/502 |
| 2016/0167495 A1 * | 6/2016 | Kamimura | B60J 5/0469 |
| | | | 52/309.1 |
| 2016/0236723 A1 * | 8/2016 | Ikeda | B60J 5/0461 |
| 2016/0263973 A1 * | 9/2016 | Kawashima | B60J 5/107 |

FOREIGN PATENT DOCUMENTS

| | | | | |
|---|---|---|---|---|
| DE | 19737966 A1 * | 8/1998 | | B29C 65/562 |
| DE | 102011000063 A1 * | 7/2012 | | B60J 5/101 |
| EP | 2653332 A2 | 10/2013 | | |
| FR | EP 0695848 A2 * | 2/1996 | | B60J 1/18 |
| FR | EP 1120303 A1 * | 8/2001 | | B60J 5/101 |
| JP | 2006-341760 A | 12/2006 | | |
| JP | 2007-313919 A | 12/2007 | | |
| JP | EP 2653331 A1 * | 10/2013 | | B60J 5/0463 |
| JP | 2014-131896 A | 7/2014 | | |

* cited by examiner

VEHICLE BACK DOOR ASSEMBLING METHOD AND VEHICLE BACK DOOR

CROSS-REFERENCE TO RELATED APPLICATION

This application claims priority under 35 USC 119 from Japanese Patent Application No. 2014-252919 filed on Dec. 15, 2014, the disclosure of which is incorporated by reference herein in its entirety.

BACKGROUND

Technical Field

Preferred embodiments relate to a vehicle back door (rear hatch) assembling method.

Related Art

Japanese Patent Application Laid-open (JP-A) No. 2014-131896 discloses a vehicle resin back door structure where an inner panel made of resin and an outer panel made of resin are joined to each other by an adhesive. To briefly describe this vehicle resin back door structure, a bent portion is formed on the vehicle width direction inside end portion of the outer panel, and the bent portion is joined by the adhesive to the inside wall of the inner panel. Furthermore, the vehicle width direction outside end portion of the outer panel is joined by an adhesive to a flange portion of the inner panel. Because of this, a closed cross section is formed by the inner panel and the outer panel. That is, once the inner panel and the outer panel are joined to each other, the inner and outer panels form a chamber that, when viewed in cross section, is surrounded on all sides by walls of the inner and outer panels. Examples of other documents that disclose related art include JP-A No. 2007-313919 and JP-A No. 2006-341760.

SUMMARY

However, the vehicle resin back door structure described above has room for improvement with respect to the following point. Namely, in the vehicle resin back door structure described above, the joint section forming by adhering the bent portion of the outer panel and the inside wall of the inner panel to each other prevents one from accessing the inside of the closed cross section (chamber) formed by the adhered inner and outer panels. For this reason, for example, after the inner panel and the outer panel have been adhered to each other, the joint section cannot be sandwiched between and held from both vehicle width direction sides by holding jigs. For this reason, there is room for improvement with respect to the point of further raising the joint strength of the joint portion between the inner panel and the outer panel.

In view of this circumstance, it is an object of preferred embodiments to provide a vehicle back door assembling method that can raise the joint strength of the joint portion between the inner panel and the outer panel.

A vehicle back door assembling method pertaining to a first aspect of the disclosure includes: a first step of forming a chamber by joining, with an adhesive, an inner panel made of resin to an outer panel made of resin; and a second step of inserting a first holding jig inside the chamber through a hole formed in the outer panel and allowing the adhesive to harden in a state in which a joint portion between the inner panel and the outer panel is sandwiched between and held by the first holding jig and a second holding jig placed outside the chamber.

In the vehicle back door assembling method pertaining to the first aspect, the inner panel made of resin and the outer panel made of resin are joined to each other by the adhesive, and the chamber is formed by the inner panel and the outer panel.

Here, the first holding jig is inserted inside the chamber through the hole formed in the outer panel. Additionally, the joint portion between the inner panel and the outer panel is sandwiched between and held by the first holding jig and the second holding jig placed outside the chamber, and in this state the adhesive is allowed to harden. For this reason, even in a case where the joint portion prevents access to the inside of the chamber, the joint portion can be sandwiched between and held by the first holding jig and the second holding jig by inserting the first holding jig inside the chamber through the hole formed in the outer panel. Because of this, the adhesive can be allowed to harden while pressure is applied to the joint portion by the first holding jig and the second holding jig. Consequently, the joint strength of the joint portion between the inner panel and the outer panel can be raised.

A vehicle back door assembling method pertaining to a second aspect of the disclosure further includes the joint portion being located on one axial direction side of the hole, and in the second step the first holding jig is inserted inside the chamber in such a way that the first holding jig extends along the axial direction of the hole.

In the vehicle back door assembling method pertaining to the second aspect of the disclosure, by inserting the first holding jig toward the one axial direction side of the hole in such a way that the first holding jig extends along the axial direction of the hole, the joint portion between the inner panel and the outer panel can be held from inside the chamber by the first holding jig. Because of this, one direction serves as the insertion direction when inserting the first holding jig inside the chamber, so workability when joining the joint portion can be improved.

A vehicle back door assembling method pertaining to a third aspect of the disclosure further includes a third step of joining a rear window glass to the vehicle outside of the outer panel so as to cover the hole with the rear window glass.

In the vehicle back door assembling method pertaining to the third aspect, the hole is covered by the rear window glass joined to the vehicle outside of the outer panel. For this reason, even in a case where the hole for inserting the first holding jig inside the chamber is formed in the outer panel, the hole can be prevented from being exposed to the outside by the rear window glass. Consequently, the joint strength of the joint portion between the inner panel and the outer panel can be raised without compromising the design of the vehicle back door.

According to the vehicle back door assembling method pertaining to the first aspect, the joint strength of the joint portion between the inner panel and the outer panel can be raised.

According to the vehicle back door assembling method pertaining to the second aspect, workability when joining the joint portion between the inner panel and the outer panel can be improved.

According to the vehicle back door assembling method pertaining to the third aspect, the joint strength of the joint portion between the inner panel and the outer panel can be raised without compromising the design of the vehicle back door.

DETAILED DESCRIPTION

Figure 1:
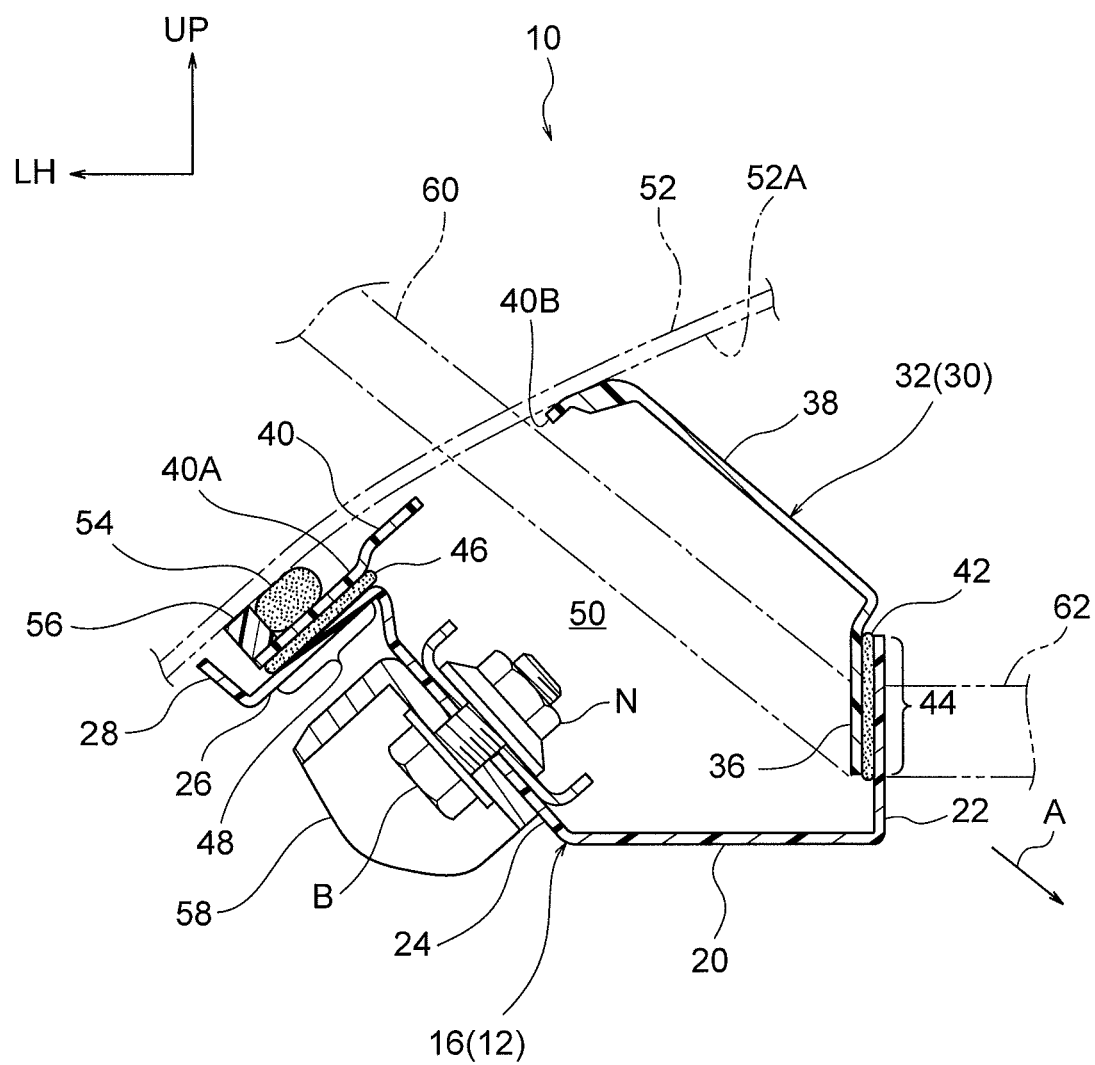
FIG. 1 is a cross-sectional view (an enlarged cross-sectional view taken along line 1-1 of FIG. 2) showing relevant portions of a vehicle back door made by a vehicle back door assembling method pertaining to a preferred embodiment.

A vehicle back door 10 (rear hatch) made by a vehicle back door assembling method pertaining to a preferred embodiment will be described below using the drawings. Arrow FR appropriately shown in the drawings indicates a vehicle front side of a vehicle (automobile) to which the vehicle back door 10 has been applied, arrow UP indicates a vehicle upper side, and arrow LH indicates a vehicle left side (one vehicle width direction side). Unless otherwise noted, when description is given below simply using the directions of front and rear, up and down, and right and left, these will be understood to mean front and rear in the vehicle front and rear direction, up and down in the vehicle up and down direction, and right and left in the vehicle right and left (width) direction.

Figure 2:
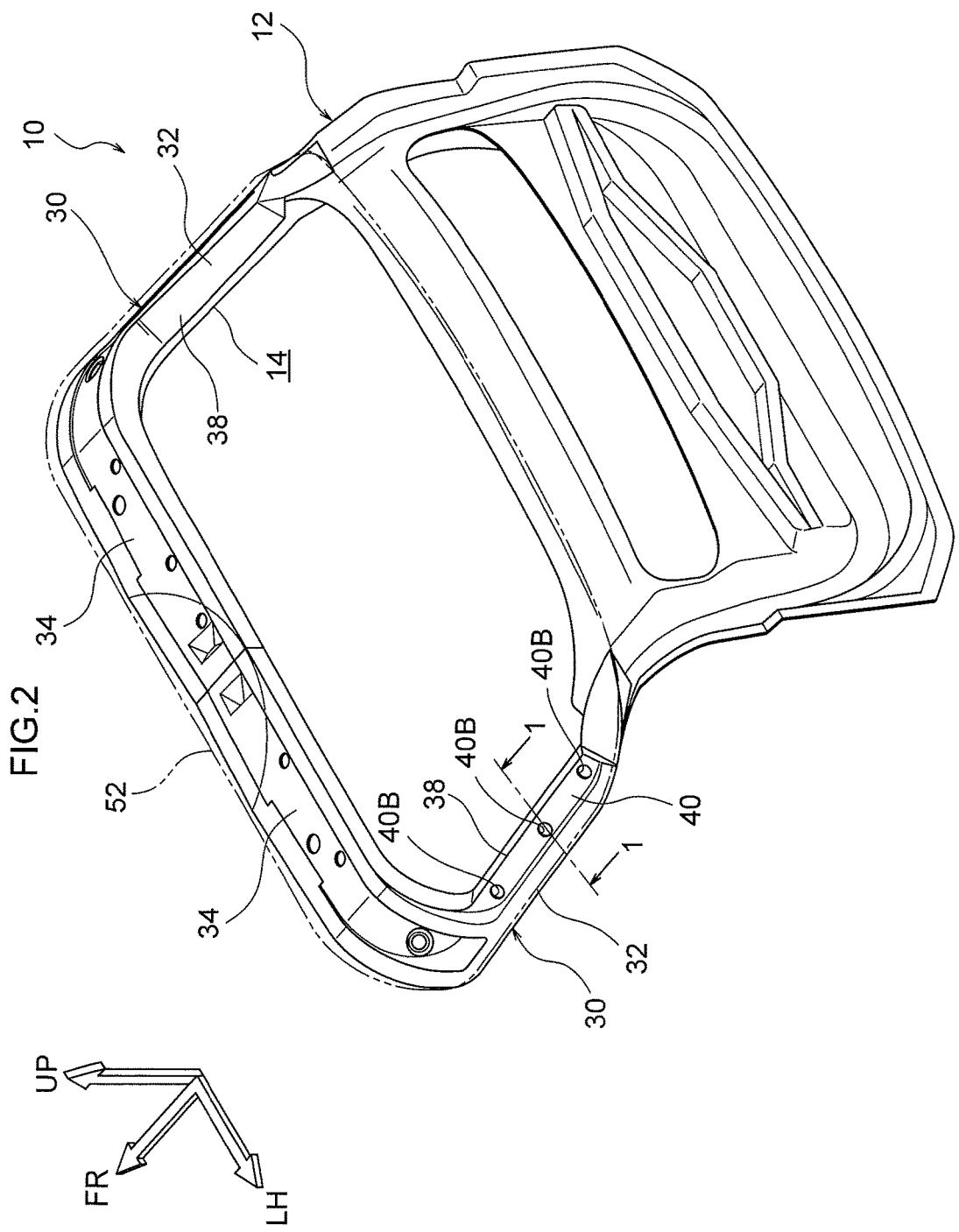
FIG. 2 is a perspective view, seen obliquely from the vehicle left and rear side, schematically showing the vehicle back door shown in FIG. 1.

In FIG. 2, the vehicle back door 10 is shown in a perspective view seen obliquely from the left and rear side. As shown in FIG. 2, the vehicle back door 10 is disposed on a rear end portion of a vehicle (automobile) not shown in the drawings. Additionally, the upper end portion of the vehicle back door 10 is fastened by hinges to the vehicle body in such a way that its axial direction coincides with the vehicle width direction, and the vehicle back door 10 is supported on the vehicle body in such a way that it can be opened and closed. Furthermore, as shown also in FIG. 3, the vehicle back door 10 is configured to include a door inner panel 12 serving as an "inner panel" that configures the vehicle inside section of the vehicle back door 10, door outer panels 30 serving as a pair of right and left "outer panels" that configure the vehicle outside section of the vehicle back door 10, and a rear window glass 52 (see FIG. 2).

Figure 3:
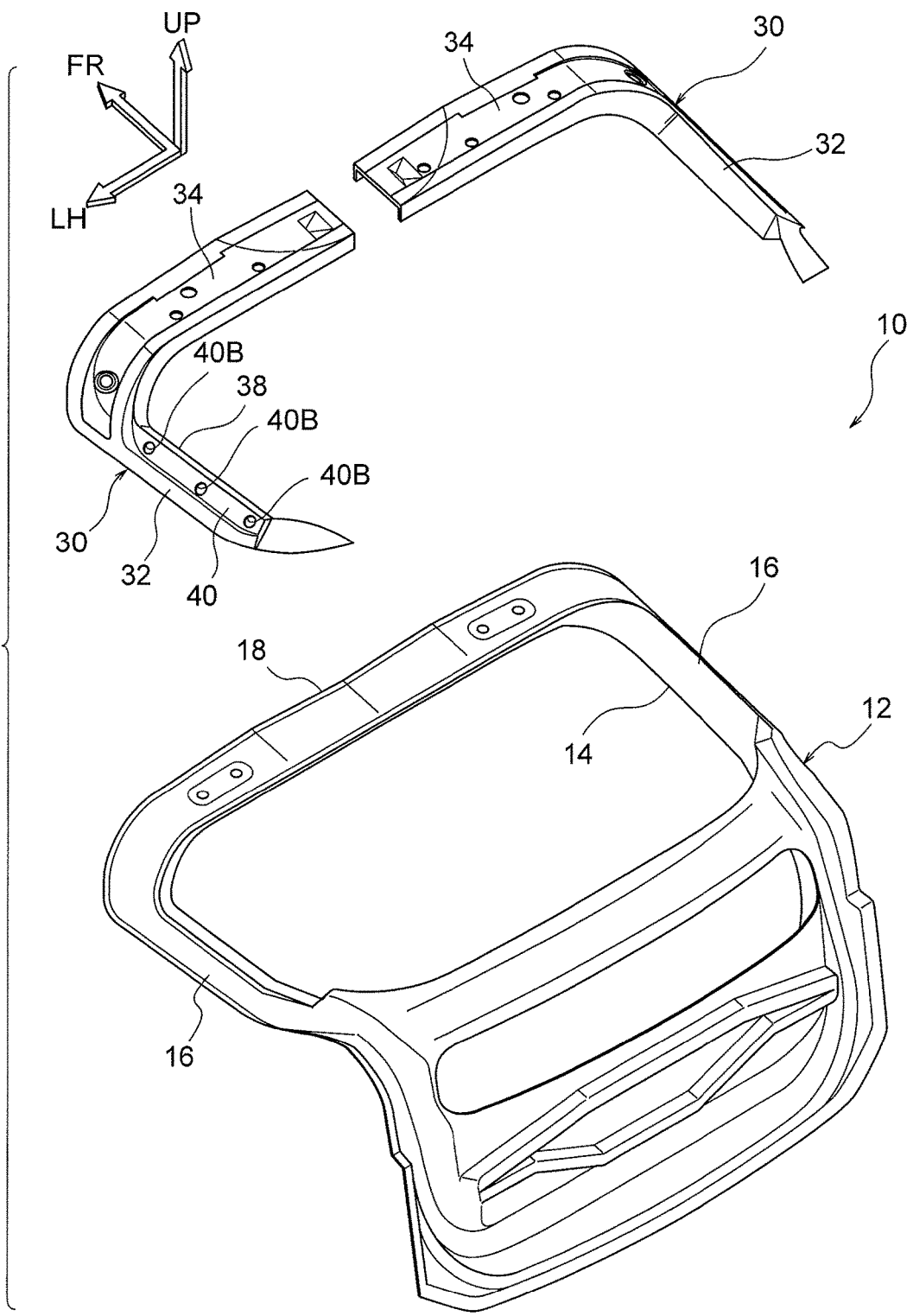
FIG. 3 is an exploded perspective view showing a state in which outer panels shown in FIG. 2 are exploded from an inner panel.

As shown in FIG. 3, the door inner panel 12 is made of a resin material (e.g., carbon fiber-reinforced plastic). Furthermore, the door inner panel 12 is formed in a substantially rectangular shape in such a way as to cover from the rear side a back door open portion in the vehicle body not shown in the drawings, and the door inner panel 12 is bent in a substantially L-shape as seen in a side view. Specifically, as seen in a side view, the upper section of the door inner panel 12 slopes forward heading upward, and the lower section of the door inner panel 12 extends in the up and down direction. Additionally, a substantially rectangular open portion 14 is formed in the upper section of the door inner panel 12. Because of this, the door inner panel 12 is equipped with a pair of right and left inner panel vertical pillars 16, which are placed on the vehicle width direction outsides of the open portion 14, and an inner panel horizontal pillar 18, which couples the upper end portions of the inner panel vertical pillars 16 to each other.

As shown in FIG. 1, the inner panel vertical pillars 16 are each formed in a substantially U-shape that opens upward as seen in a cross-sectional view seen from the lengthwise direction of the inner panel vertical pillars 16. More specifically, the inner panel vertical pillars 16 are each configured to include a bottom wall portion 20 that extends in the vehicle width direction as seen in a cross-sectional view seen from the lengthwise direction, an inner panel-side inner wall portion 22 that extends upward from the vehicle width direction inside end of the bottom wall portion 20, and an inner panel-side outer wall portion 24 that extends outward in the vehicle width direction heading upward from the vehicle width direction outside end of the bottom wall portion 20.

Furthermore, a flange portion 26 is integrally formed on the vehicle width direction outside end of the inner panel vertical pillar 16. The flange portion 26 extends downward heading outward in the vehicle width direction from the vehicle width direction outside end of the inner panel-side outer wall portion 24, and the angle formed by the flange portion 26 and the inner panel-side outer wall portion 24 is set to a substantially right angle. Moreover, a bent portion 28 is formed on the distal end portion of the flange portion 26. The bent portion 28 is bent upward in such a way as to form a substantially right angle with the flange portion 26 and is placed substantially parallel to the inner panel-side outer wall portion 24.

A damper stay 58 is fastened and secured by bolts B and nuts N to the inner panel-side outer wall portion 24 of the inner panel vertical pillar 16.

As shown in FIG. 3, the pair of right and left door outer panels 30 are made of a resin material (e.g., carbon fiber-reinforced plastic) like the door inner panel 12. Additionally, the pair of door outer panels 30 are configured to be bilaterally symmetrical in the vehicle width direction. For this reason, in the following description the door outer panel 30 placed on the left side will be described and description of the door outer panel 30 placed on the right side will be omitted.

The door outer panels 30 are joined to the door inner panel 12 in such a way as to cover the upper surfaces of the inner panel vertical pillars 16 and the inner panel horizontal pillar 18. That is, the door outer panels 30 are configured to include outer panel vertical pillars 32, which cover the inner panel vertical pillars 16, and outer panel horizontal pillars 34, which extend inward in the vehicle width direction from the upper end portions of the outer panel vertical pillars 32 and cover the inner panel horizontal pillar 18.

As shown in FIG. 1, each outer panel vertical pillar 32 is formed in a substantially V-shape that opens downward as seen in a cross-sectional view seen from the lengthwise direction of the outer panel vertical pillar 32. Specifically, each outer panel vertical pillar 32 has an outer panel-side inner wall portion 36, which defines the vehicle width direction inside end portion of the outer panel vertical pillar 32 and is placed in such a way that its plate thickness direction coincides with the vehicle width direction, and a coupling wall portion 38, which extends upward heading outward in the vehicle width direction from the upper end of the outer panel-side inner wall portion 36. Furthermore, the outer panel vertical pillar 32 has an outer panel-side outer wall portion 40 that extends downward heading outward in the vehicle width direction from the vehicle width direction outside end of the coupling wall portion 38, and the angle formed by the outer panel-side outer wall portion 40 and the coupling wall portion 38 is set to a substantially right angle. Moreover, a step portion 40A is formed on the vehicle width direction outside end portion of the outer panel-side outer wall portion 40. The step portion 40A is bent downward in the shape of a step and is placed in such a way as to be substantially parallel to the outer panel-side outer wall portion 40.

Moreover, plural projecting surfaces (projections) (not shown in the drawings) that project a small amount inward in the vehicle width direction are formed on the vehicle width direction inside surface of the outer panel-side inner wall portion 36. The projecting surfaces are spaced a predetermined distance apart from each other in the lengthwise direction of the outer panel vertical pillar 32. Additionally, the outer panel-side inner wall portion 36 is placed in such a way as to lie on the vehicle width direction outside of the inner panel-side inner wall portion 22, and the projecting surfaces of the outer panel-side inner wall portion 36 are in contact with the vehicle width direction outside surface of the inner panel-side inner wall portion 22. Because of this, plural spaces are formed between the outer panel-side inner wall portion 36 and the inner panel-side inner wall portion 22. Additionally, an adhesive 42 is placed in such a way as to fill the spaces, and the outer panel-side inner wall portion 36 and the inner panel-side inner wall portion 22 are joined to each other by the adhesive 42. Because of this, the outer panel-side inner wall portion 36 and the inner panel-side inner wall portion 22 that have been joined to each other form a first joint portion 44 serving as a "joint portion".

The outer panel-side outer wall portion 40 is placed in such a way as to be parallel to the flange portion 26 of the door inner panel 12 on the upper side of the flange portion 26, and the step portion 40A of the outer panel-side outer wall portion 40 is placed in such a way as to lie on the upper side of the flange portion 26. Furthermore, an adhesive 46 is interposed between the step portion 40A of the outer panel-side outer wall portion 40 and the flange portion 26 of the door inner panel 12, and the step portion 40A and the flange portion 26 are joined to each other by the adhesive 46. Additionally, the step portion 40A of the outer panel-side outer wall portion 40 and the flange portion 26 that have been joined to each other form a second joint portion 48.

Because of this, a closed cross section 50 (i.e., a chamber that is enclosed (surrounded on all sides) when viewed in cross section) having a substantially pentagonal shape is formed by the door inner panel 12 and the door outer panels 30. Additionally, in a state in which the door inner panel 12 and the door outer panels 30 are joined to each other, the first joint portion 44 is configured as a wall portion that divides the inside and the outside of the closed cross section (chamber) 50 from each other. That is, the outer panel-side inner wall portion 36 is configured as a wall portion of the first joint portion 44 on the closed cross section (chamber) 50 side, and the inner panel-side inner wall portion 22 is configured as a wall portion of the first joint portion 44 on the opposite side of the closed cross section (chamber) 50 side. Moreover, in this state, the coupling wall portions 38 are placed in such a way as to be substantially parallel to the inner panel-side outer wall portion 24 of the door inner panel 12 on the upper side of the bottom wall portion 20 of the door inner panel 12, and the second joint portion 48 is placed on the outside of the closed cross section (chamber) 50.

Furthermore, jig insertion holes 40B serving as cross-sectionally circular-shaped "hole portions" or "holes" are formed through the outer panel-side outer wall portion 40 of each door outer panel 30. Because of this, the inside and the outside of the closed cross section (chamber) 50 are communicated with each other by the jig insertion holes 40B. That is, the chamber 50 can be accessed through the jig insertion holes 40B. Additionally, the vehicle back door 10 is configured in such a way that, by inserting a first holding jig 60 described later through the jig insertion holes 40B, the first holding jig 60 can be placed inside the closed cross section (chamber) 50. Furthermore, a plurality of the jig insertion holes 40B are formed in the outer panel-side outer wall portion 40 and are spaced a predetermined distance apart from each other in the lengthwise direction of each outer panel vertical pillar 32 (see FIG. 2 and FIG. 3). Specifically, the jig insertion holes 40B are placed between the projecting surfaces of the outer panel-side inner wall portion 36 adjacent to each other in the lengthwise direction of the outer panel vertical pillar 32. Moreover, the jig insertion holes 40B are placed on the vehicle width direction outside and upper side of the first joint portion 44, and the first joint portion 44 is placed on one axial direction side (the side in the direction of arrow A in FIG. 1) of the jig insertion holes 40B.

As shown in FIG. 2, the rear window glass 52 is formed in a substantially rectangular flat-plate shape that gently curves upward. Additionally, the rear window glass 52 is placed on the upper side (the vehicle outside) of the door outer panels 30 in such a way as to close off the open portion 14 of the door inner panel 12. As shown in FIG. 1, the vehicle width direction outside end portion of the rear window glass 52 is placed substantially parallel to the outer panel-side outer wall portion 40 of each door outer panel 30. Additionally, an adhesive 54 is placed in such a way as to fill the space between the rear window glass 52 and the step portion 40A of the outer panel-side outer wall portion 40. Because of this, the rear window glass 52 and each door outer panel 30 are joined to each other by the adhesive 54. Furthermore, in this state, the vehicle width direction outside edge portion of the rear window glass 52 is placed in proximity to the distal end portion of the bent portion 28 of each door outer panel 30, and a slight space is formed between the rear window glass 52 and the bent portion 28.

Moreover, a seal member 56 is disposed between the step portion 40A of the outer panel-side outer wall portion 40 and the rear window glass 52 in a position on the vehicle width direction outside of the adhesive 54, and the space between each door outer panel 30 and the rear window glass 52 is sealed by the seal member 56. Furthermore, although it is not shown in the drawings, black paint is applied to an inside surface 52A of the rear window glass 52 in the section opposing the outer panel-side outer wall portion 40 of each door outer panel 30. Because of this, the vehicle back door 10 is configured in such a way that, in a state in which the rear window glass 52 is joined to each door outer panel 30, the outer panel-side outer wall portion 40 is not visible from the outside.

Next, the first holding jig 60, which is used when joining each door outer panel 30 to the door inner panel 12, will be described. As shown in FIG. 1, when joining each door outer panel 30 to the door inner panel 12, the first holding jig 60 is inserted through each jig insertion hole 40B to join the outer panel-side inner wall portion 36 and the inner panel-side inner wall portion 22 to each other. The first holding jig 60 is formed in a substantially cylindrical shape. Furthermore, when inserting the first holding jig 60 through each jig insertion hole 40B, the first holding jig 60 is inserted through the jig insertion hole 40B in such a way that the first holding jig 60 extends along the axis of the jig insertion hole 40B (i.e., obliquely downward and inward in the vehicle width direction). Moreover, the distal end surface of the first holding jig 60 is formed along a direction intersecting the axis of the first holding jig 60. Specifically, the distal end surface of the first holding jig 60 is formed in such a way that the distal end surface extends along a direction substantially orthogonal to the vehicle width direction in a state in which the first holding jig 60 is inserted through the jig insertion hole 40B.

Next, the action and effects of the present embodiment will be described while describing the sequence of joining the door inner panel 12, the door outer panels 30, and the rear window glass 52 to each other.

First, when joining the door outer panels 30 to the door inner panel 12, the door outer panels 30 are placed in such a way as to oppose the inner panel vertical pillars 16 and inner panel horizontal pillar 18 of the door inner panel 12. Then, the adhesive 42 is applied to the vehicle width direction inside surface of the outer panel-side inner wall portion 36 of each door outer panel 30 (specifically the sections excluding the projecting surfaces of the outer panel-side inner wall portion 36), and the adhesive 46 is applied to the lower surface of the step portion 40A of each door outer panel 30.

In this state, each door outer panel 30 is joined to the door inner panel 12 in such a way that the closed cross section (chamber) 50 is formed by the door inner panel 12 and the door outer panel 30 (a first step). Specifically, each outer panel-side inner wall portion 36 is placed in such a way as to lie on the vehicle width direction outside of the inner panel-side inner wall portion 22, and the inner panel-side inner wall portion 22 and the outer panel-side inner wall portion 36 are joined to each other by the adhesive 42. Furthermore, the step portion 40A of each door outer panel 30 is placed in such a way as to lie on the upper side of the flange portion 26 of the door inner panel 12, and the flange portion 26 and the step portion 40A are joined to each other by the adhesive 46. Because of this, the door inner panel 12 and each door outer panel 30 are joined to each other at the first joint portion 44 and the second joint portion 48, and the closed cross section (chamber) 50 is formed by the door inner panel 12 and each door outer panel 30.

Next, as shown in FIG. 1, before the adhesive 42 in the first joint portion 44 hardens, the first holding jig 60 is inserted inside the closed cross section (chamber) 50 through the jig insertion hole 40B formed in the door outer panel 30, the first joint portion 44 is sandwiched between and held by the first holding jig 60 and a second holding jig 62 placed outside the closed cross section (chamber) 50, and the adhesive 42 is allowed to harden (a second step).

Specifically, the first holding jig 60 is inserted through the jig insertion hole 40B (toward the side in the direction of arrow A in FIG. 1) in such a way that the first holding jig 60 extends along the axis of the jig insertion hole 40B, and the distal end portion of the first holding jig 60 is placed inside the closed cross section (chamber) 50. Furthermore, because the first joint portion 44 is placed on the one axial direction side of the jig insertion hole 40B, the distal end portion of the first holding jig 60 is placed adjacent to the vehicle width direction outside of the first joint portion 44. Moreover, in a state in which the first holding jig 60 is inserted through the jig insertion hole 40B, the distal end surface of the first holding jig 60 is placed along a direction substantially orthogonal to the vehicle width direction. For this reason, the distal end surface of the first holding jig 60 and the vehicle width direction outside surface of the outer panel-side inner wall portion 36 are placed opposing each other in the vehicle width direction.

The second holding jig 62 is formed in a cylindrical shape whose axial direction coincides with the vehicle width direction, and the second holding jig 62 is placed on the vehicle width direction inside of the inner panel-side inner wall portion 22. Specifically, the second holding jig 62 is placed in such a way that the distal end surface (the vehicle width direction outside end surface) of the second holding jig 62 opposes the distal end surface of the first holding jig 60 via the first joint portion 44 in the vehicle width direction. Additionally, the first joint portion 44 is sandwiched between and held from both vehicle width direction sides by the distal end surface of the first holding jig 60 and the distal end surface of the second holding jig 62. Moreover, after a predetermined amount of time elapses since establishing this state, the first holding jig 60 is moved toward the other axial direction side of the jig insertion hole 40B and the second holding jig 62 is moved inward in the vehicle width direction so that the first holding jig 60 and the second holding jig 62 are moved away from the first joint portion 44. As a result, the adhesive 42 between the outer panel-side inner wall portion 36 and the inner panel-side inner wall portion 22 hardens in a state in which pressure is applied from both vehicle width direction sides to the first joint portion 44. It suffices for the predetermined amount of time to be set in such a way that the joint strength at the first joint portion 44 can be ensured. For this reason, for example, the predetermined amount of time may be set shorter than the hardening time in which the adhesive 42 hardens.

Next, the seal member 56 is placed on the step portion 40A of each outer panel-side outer wall portion 40, and the adhesive 54 is applied to the upper surface of the step portion 40A. Then, the rear window glass 52 is joined by the adhesive 54 to the step portion 40A of each door outer panel 30 in such a way as to close off from above the open portion 14 of the door inner panel 12 (a third step). At this time, the outer panel-side outer wall portion 40 of each door outer panel 30 is covered by the section of the rear window glass 52 to which the paint has been applied. For this reason, the rear window glass 52 is joined to each door outer panel 30 in a state in which the outer panel-side outer wall portion 40 (including the jig insertion holes 40B) is not visible from the outside.

As described above, in the vehicle back door 10 of the present embodiment, the closed cross section (chamber) 50 is formed by the door inner panel 12 and each door outer panel 30, and the first joint portion 44 that is the joint portion between the door inner panel 12 and each door outer panel 30 is configured as a wall portion that prevents access to the inside of the closed cross section (chamber) 50. Furthermore, the jig insertion holes 40B that communicate the inside and the outside of the closed cross section (chamber) 50 with each other are formed in the outer panel-side outer wall portion 40 of each door outer panel 30, and the first joint portion 44 is placed on the one axial direction side of the jig insertion holes 40B. For this reason, even in a case where the first joint portion 44 is configured as a wall portion that prevents access to the inside of the closed cross section (chamber) 50, the first joint portion 44 can be sandwiched between and held by the first holding jig 60 and the second holding jig 62 by inserting the first holding jig 60 inside the closed cross section (chamber) 50 from the jig insertion holes 40B formed in each door outer panel 30. Because of this, the adhesive 42 can be allowed to harden while pressure is applied to the first joint portion 44 from both vehicle width direction sides. Consequently, the joint strength at the first joint portion 44 can be raised.

Furthermore, because the adhesive 42 is allowed to harden while pressure is applied to the first joint portion 44 from both vehicle width direction sides, the thickness of the adhesive 42 can be made uniform in the space between the inner panel-side inner wall portion 22 and each outer panel-side inner wall portion 36, and variations in the thickness dimension of the first joint portion 44 after the adhesion can be controlled.

Furthermore, in the present embodiment, the first joint portion 44 is placed on the one axial direction side of the jig insertion hole 40B. For this reason, by inserting the first holding jig 60 through the jig insertion hole 40B in such a way that the first holding jig 60 extends along the axial direction of the jig insertion hole 40B, the outer panel-side inner wall portion 36 of the first joint portion 44 can be held from inside the closed cross section (chamber) 50 by the first holding jig 60. Because of this, one direction serves as the insertion direction when inserting the first holding jig 60 inside the closed cross section (chamber) 50, so workability when joining the first joint portion 44 in the second step can be improved.

Furthermore, in the present embodiment, by joining the rear window glass 52 to the step portion 40A of each door outer panel 30 in the third step, the jig insertion holes 40B are covered by the rear window glass 52. For this reason, even in a case where the jig insertion holes 40B for inserting the first holding jig 60 inside the closed cross section (chamber) 50 are formed in the door outer panels 30, the jig insertion holes 40B can be prevented from being seen from the outside by the section of the rear window glass 52 where the paint is applied. Consequently, the joint strength at the first joint portion 44 can be raised without compromising the design of the vehicle back door 10.

Furthermore, as mentioned above, the jig insertion holes 40B into which the first holding jig 60 is inserted are formed in the outer panel-side outer wall portion 40 of each door outer panel 30. For this reason, for example, when the vehicle is involved in a rear-end crash, a crash load equal to or greater than a predetermined value from the vehicle rear side toward the vehicle front side is input to the lower portion of the vehicle back door 10, the vehicle back door 10 can be allowed to become deformed in such a way as to bend starting at the jig insertion holes 40B in the door outer panels 30. Because of this, even in a case where the vehicle back door 10 is configured by a resin material, for example, the deformation mode of the vehicle back door 10 when the vehicle is involved in a rear-end crash can be stabilized, and therefore the protection performance with respect to the vehicle occupants can be stabilized.

In the present embodiment, in the first joint portion 44, the outer panel-side inner wall portion 36 is placed on the closed cross section (chamber) 50 side and the inner panel-side inner wall portion 22 is placed on the opposite side of the closed cross section (chamber) 50 side. Instead of this, in the first joint portion 44, the outer panel-side inner wall portion 36 may be placed on the opposite side of the closed cross section (chamber) 50 side and the inner panel-side inner wall portion 22 may be placed on the closed cross section (chamber) 50 side.

Furthermore, in the present embodiment, the projecting surfaces are formed on the vehicle width direction inside surface of each outer panel-side inner wall portion 36, but the projecting surfaces may also be formed on the vehicle width direction outside surface of the inner panel-side inner wall portion 22, with the projecting surfaces on the outer panel-side inner wall portion 36 being omitted.

Furthermore, in the present embodiment, the closed cross section (chamber) 50 is formed in a substantially pentagonal shape, but the shape of the closed cross section (chamber) may be appropriately changed in correspondence to various types of vehicles. In this case, the position of the jig insertion holes 40B in each outer panel-side outer wall portion 40 may also be appropriately changed. That is, it suffices for the vehicle back door 10 to have a structure where the first joint portion 44 can be held from inside the closed cross section (chamber) 50 by the first holding jig 60.

What is claimed is:

1. A method of assembling a vehicle back door, the method comprising:
    forming a chamber by joining, with an adhesive, an inner panel made of resin to an outer panel made of resin; and
    inserting a first holding jig inside the chamber through a hole formed in the outer panel and allowing the adhesive to harden in a state in which a joint portion between the inner panel and the outer panel is sandwiched between and held by the first holding jig and a second holding jig placed outside the chamber.

2. The method according to claim 1, further comprising joining a rear window glass to an outside of the outer panel so as to cover the hole with the rear window glass.

3. The method according to claim 1, wherein the outer panel includes left and right panels that are separately adhered to the inner panel.

4. The method according to claim 1, wherein:
    the hole has a central axis and the joint portion is located on one axial direction side of the hole, and
    inserting the first holding jig comprises inserting the first holding jig inside the chamber in such a way that the first holding jig extends along the axial direction of the hole.

5. The method according to claim 4, further comprising joining a rear window glass to an outside of the outer panel so as to cover the hole with the rear window glass.

6. The method according to claim 1, wherein the inner panel defines an opening over which a vehicle rear window is to be installed.

7. The method according to claim 6, wherein the outer panel includes left and right panels that are separately adhered to the inner panel.

8. A method of assembling a vehicle back door, the method comprising:
    joining, with an adhesive, an inner panel made of resin to an outer panel made of resin so as to form a hollow chamber between the inner and outer panels, the adhesive being applied at a joint portion of the inner and outer panels; and
    inserting a distal end of a first holding jig through a hole formed in the outer panel until the distal end contacts the joint portion inside the hollow chamber, and allowing the adhesive to harden in a state in which the joint portion is sandwiched between and held by the first holding jig and a second holding jig which contacts the joint portion outside the chamber.

9. The method according to claim 8, further comprising joining a rear window glass to an outside of the outer panel so as to cover the hole with the rear window glass.

10. The method according to claim 8, wherein the outer panel includes left and right panels that are separately adhered to the inner panel.

11. The method according to claim 8, wherein:
    the hole has a central axis and the joint portion is located on a side of the chamber located across the chamber from the hole, and
    inserting the distal end of the first holding jig comprises inserting the distal end of the first holding jig into the chamber in such a way that the first holding jig extends along an axial direction of the hole.

12. The method according to claim 11, further comprising joining a rear window glass to an outside of the outer panel so as to cover the hole with the rear window glass.

13. The method according to claim 8, wherein the inner panel defines an opening over which a vehicle rear window is to be installed.

14. The method according to claim 13, wherein the outer panel includes left and right panels that are separately adhered to the inner panel.

15. A vehicle back door comprising:
   an inner panel made of resin;
   an outer panel made of resin; and
   a rear window glass, wherein
   the inner panel and the outer panel enclose a hollow chamber in a joined state,
   the rear window glass is joined to an outer surface of the outer panel, and
   at least one hole is formed in the outer panel on a side of the hollow chamber which is opposite to a joint portion between the inner panel and the outer panel, the at least one hole being covered by the rear window glass.

16. The vehicle back door according to claim 15, wherein black paint is provided on an inside surface of the rear window glass at a location opposing the at least one hole of the outer panel.

* * * * *